(No Model.)
D. F. STAUFFER.
APPARATUS FOR TREATING BRETZELS AND CRACKERS.
No. 345,186. Patented July 6, 1886.
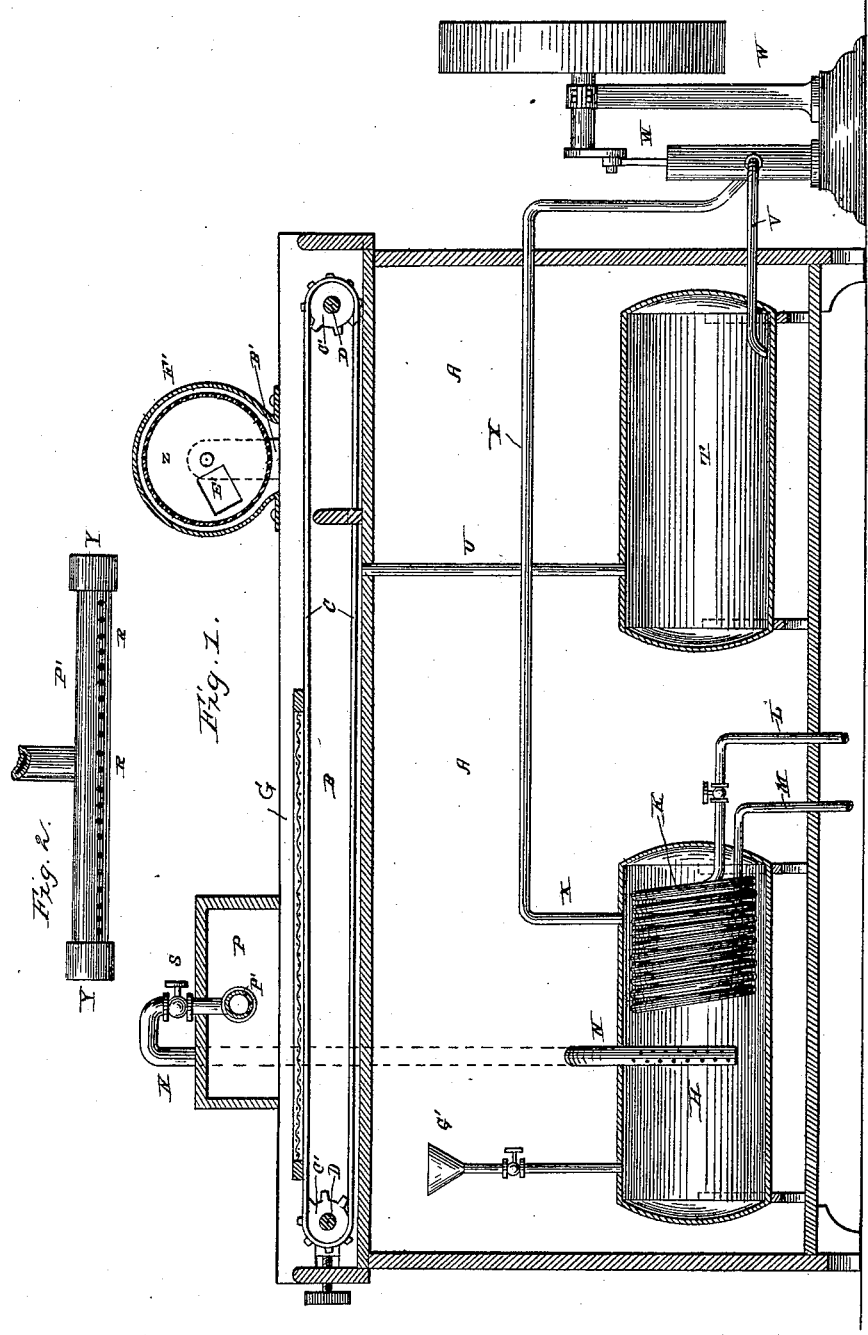
WITNESSES
INVENTOR
Attorney

UNITED STATES PATENT OFFICE.

DAVID F. STAUFFER, OF YORK, PENNSYLVANIA.

APPARATUS FOR TREATING BRETZELS AND CRACKERS.

SPECIFICATION forming part of Letters Patent No. 345,186, dated July 6, 1886.

Application filed June 4, 1885. Serial No. 167,627. (No model.)

*To all whom it may concern:*

Be it known that I, DAVID F. STAUFFER, a citizen of the United States, residing at York, in the county of York and State of Pennsylvania, have invented certain new and useful Improvements in Apparatus for Treating Bretzels and Crackers, of which the following is a specification, reference being had therein to the accompanying drawings.

This invention relates to certain improvements in apparatus for preparing unbaked bretzels, crackers, and other similar articles formed of dough for baking, so as to more conveniently give them the glazed and salted surfaces characteristic of such articles when baked, as more fully hereinafter described.

Heretofore the dough, when properly prepared and cut or otherwise formed into proper shape, has been dipped in a suitable solution and the salt afterward sprinkled over the same by hand, which is a slow and tedious operation, involving the loss, in addition, of considerable material, which is scattered and wasted.

It is the object of the present invention to provide an apparatus by which these operations may be conveniently and thoroughly effected with comparatively little loss of material, and in a much more thorough and expeditious manner than heretofore. This object I attain by the means illustrated in the accompanying drawings, in which—

Figure 1 represents a longitudinal vertical sectional view showing my apparatus entire, and Fig. 2 a detail of the spray-pipe.

The letter A indicates a rectangular casing, having a suitable door, and a rectangular trough, B, at the top, in which trough are arranged to travel back and forth the endless carriers C, the said carriers passing over sprocket-wheels C', mounted on the shafts D, journaled near each end of the trough, the carriers running close up to the inner sides of the same. The journal of one of the shafts extends through one side of the trough, and is provided with a pulley driven by any suitable motive power, by which the carrier may be moved. Upon the carrier, and adapted to move with it, is a reticulated shelf, G, upon which the articles to be treated are placed.

In the lower part of the casing is located a small boiler or vapor-generator, H, in which is located a coil, K, which connects by means of a pipe, L, leading from one end, with an ordinary steam-boiler, (not shown,) the other end connecting by means of a pipe, M, with the open air or a suitable condenser.

The letter N indicates a pipe extending from a point near the bottom of the boiler H, upward through its top and out of the apparatus at one side. At its upper end the said pipe is turned downward, and passes down through the top of a casing, P, located on the top of the trough at one end directly above a portion of the reticulated shelf before mentioned. The pipe N, at its termination within the casing P, is provided with a communicating transverse horizontal pipe, P', which is provided with numerous perforations, R, through which the vapor and finely-subdivided hot liquid from the boiler or generator may be distributed and diffused into said casing and upon the articles placed upon the reticulated shelf. The pipe N is provided with a valve or cock, S, by means of which the delivery of the vaporized or sprayed liquid may be regulated.

At one end of the casing, opposite to that in which the boiler or generator is located, is placed a similar vessel, T, which connects with the lower part of the trough by means of a pipe, U, in such manner that all superfluous liquid sprayed upon the foraminous shelf and articles, and all condensed vapor collecting in the trough, will pass into said vessel and will be collected therein. From the lower part of said vessel extends a pipe, V, which connects with a pump, W, of any suitable description and driven by any suitable power; and from said pump extends a pipe, X, back to the boiler or generator H, by means of which the superfluous liquor escaping from the trough is conducted back into the said boiler, so as to be used over and over again until exhausted, and thus prevent any possibility of waste. The horizontal spray-pipe is provided with removable caps Y at each end, which, when detached, will permit any collected solid obstructions to be blown out by the steam passed into said pipe. At the top of the trough, near one end, opposite to that at which the spraying devices are located, is a perforated or reticulated drum, Z, which is mounted in standards B', mounted upon the upper edges of the trough. One journal of the said drum projects beyond its bearings, and is provided with a pulley, which connects with the pulley on the main driving-shaft, which gives motion to the carrier, so as to rotate the drum as the carrier and its reticulated shelf are moved. One head of the drum is provided with a suitable opening, E', through which it may be properly charged with salt, to be sprinkled upon the articles, as more fully hereinafter explained. Over the top of the drum is adjustably secured a hood or cover, F', which prevents the scattering of the salt and the access of dust or dirt. The generator or boiler is provided with a funnel-tube, G', by means of which it may be filled with liquid when required.

The operation of my invention is as follows: The articles to be prepared are placed upon the reticulated shelf, and the shelf is moved by means of the carrier and its operating mechanism, so as to bring the articles directly under the spraying device. The liquid or vapor is then admitted through the connecting-tube from the boiler or generator, and from thence is sprayed or diffused upon the articles. The spray is then stopped and the carrier moved so as to bring the articles under the perforated drum, after which the shelf is removed, at one end of the trough, through a suitable opening for the purpose, and the articles are placed in an oven for baking. The surplus solution passes from the trough into the collecting-vessel, from whence it is passed back to the generator or boiler, to be used over again, as before mentioned.

Having thus described my invention, what I claim, and desire to secure by Letters Patent, is—

1. The combination, with the generator, of the perforated pipe leading from near the bottom of the generator, and connecting with a perforated spray-pipe above the carrier, whereby the alkaline solution is forced out of the generator and sprayed over the articles, substantially as specified.

2. The combination, with the generator and perforated pipe, of the spray-pipe and casing located over the carrier, substantially as specified.

3. The combination, with the generator and the spraying and salting devices, of the collecting-trough, whereby the salt solution is collected, and the tank and pump, with the pipes for conveying the salt solution back to the generator, substantially as specified.

In testimony whereof I affix my signature in presence of two witnesses.

DAVID F. STAUFFER.

Witnesses:
CHAS. D. DAVIS,
ELIAS KOHLER.